(12) United States Patent
Leibold

(10) Patent No.: US 8,578,817 B2
(45) Date of Patent: Nov. 12, 2013

(54) MODULAR TRANSMISSION SYSTEM

(75) Inventor: Hubert Leibold, Forst (DE)

(73) Assignee: SEW-EURODRIVE GmbH & Co., Bruchsal (DE)

( * ) Notice: Subject to any disclaimer, the term of this patent is extended or adjusted under 35 U.S.C. 154(b) by 714 days.

(21) Appl. No.: 10/221,925

(22) PCT Filed: Jan. 3, 2001

(86) PCT No.: PCT/EP01/00023
§ 371 (c)(1),
(2), (4) Date: Sep. 17, 2002

(87) PCT Pub. No.: WO01/71220
PCT Pub. Date: Sep. 27, 2001

(65) Prior Publication Data
US 2003/0047018 A1    Mar. 13, 2003

(30) Foreign Application Priority Data
Mar. 20, 2000  (DE) .................................. 100 13 785

(51) Int. Cl.
*F16H 57/02* (2012.01)
(52) U.S. Cl.
USPC .......................................... 74/606 R; 74/416
(58) Field of Classification Search
USPC ............. 74/424.5, 22 A, 63, 745, 606 R, 425, 74/417, 420, 665 GC, 664 H
See application file for complete search history.

(56) References Cited

U.S. PATENT DOCUMENTS

| | | | | |
|---|---|---|---|---|
| 1,545,681 | A * | 7/1925 | Moyer | 409/77 |
| 2,037,890 | A * | 4/1936 | Dow | 173/170 |
| 3,645,148 | A | 2/1972 | Schrempp | |
| 3,977,268 | A * | 8/1976 | Seabrook | 74/417 |
| 4,226,136 | A * | 10/1980 | Porter et al. | 74/416 |
| 4,242,923 | A * | 1/1981 | Nishikawa et al. | 475/160 |
| 5,501,117 | A * | 3/1996 | Mensing et al. | 74/420 |
| 5,634,374 | A * | 6/1997 | Depietri | 74/420 |
| 6,626,059 | B1 * | 9/2003 | Fischer et al. | 74/417 |

FOREIGN PATENT DOCUMENTS

| | | |
|---|---|---|
| DE | 43 09 559 | 9/1994 |
| DE | 197 33 546 | 4/1999 |
| EP | 0 557 961 | 9/1993 |
| EP | 557961 A1 * | 9/1993 |
| EP | 0 632 213 | 1/1995 |

(Continued)

OTHER PUBLICATIONS

Sew Eurodrive. Operation Instructions Transmission R.F.K.S.W., pp. 7-11 (May 2001).

(Continued)

*Primary Examiner* — David M Fenstermacher
*Assistant Examiner* — Terence Boes
(74) *Attorney, Agent, or Firm* — Crowell & Moring LLP

(57) ABSTRACT

The invention relates to a modular transmission system, comprising in at least one transmission stage with a housing a plurality of transmissions with different multiplications, each having a first transmission step comprising an annular gear with a pinion offset, said pinion off-set being identical for all transmissions of one transmission stage. The modular transmission system is provided with at least one first pinion of the angular gear with a first serrated crown gear in a crown gear serration and a second pinion with a second crown gear in a spiroplan gearing.

11 Claims, 4 Drawing Sheets

(56) References Cited

FOREIGN PATENT DOCUMENTS

| | | |
|---|---|---|
| GB | 2 052 676 | 1/1981 |
| JP | 6-280946 | 10/1994 |
| WO | WO 94/10482 | 5/1994 |

OTHER PUBLICATIONS

Mensing. "The alternative angular gear motor". *Der Konstructeur*, pp. 30-32 (Dec. 1995).

Bryant et al. "Which right-angle gear system". In Chironis (Ed.) *Gear Design and Application*., New York: McGraw-Hill Book Company, pp. 44-55, (1967).

Darle, *Handbook of Practical Gear Design*, USA: Donneley & Sons Co., S. 1.49-1.51, S.2.53-2.54, S. 3.59.3.60 (1984).

Niemann et al.. "Maschinenelemente". Berlin: Spring, pp. 22-23 (1983).

EUROTRANS. European Committee of the Professional Association of the Produces or Transmissions and Drive Elements. Berlin: Springer, pp. 131 (1982).

\* cited by examiner

MODULAR TRANSMISSION SYSTEM

CROSS-REFERENCE TO RELATED APPLICATIONS

PCT/EP01/00023 file Jan. 3, 2001

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Field of the Invention

The invention relates to a modular transmission system such as is often employed in motive power engineering, in particular to adapt the rotational speed and the driving torque of an electric motor for a particular purpose, e.g. for use in a mechanical installation. Here the problem arises that depending on the intended application, a great variety of transmission ratios should be implemented with as little complexity as possible, by means of only a few specific motors (or even only a single motor).

BACKGROUND OF THE INVENTION

A transmission system of this kind is disclosed, for example, in the patent DE 197 33 546 C1. In that publication it is proposed to construct at least one gear module as an angular gear, which can be combined with a plurality of drive modules. The angular gear module is specified as a crown gear, the crown wheel of which is adapted to engage each of the output pinions of a drive motor. However, if it is desired to encompass very large ranges of transmission ratios, with the known transmission modules several gear housings must be provided, because crown gears customarily allow transmission ratios to vary merely within a range of about 1-6. The additional transmission stages (with spur wheels) proposed in that publication also allow only limited variation within a single housing.

Another modular transmission system is known from the patent EP 0 557 961 B1. As input stage an axially offset angular gear is proposed, specifically a bevel gear, and as the subsequent additional transmission stages cylindrical gears are shown. The problem area associated with this system corresponds to that described above. In particular, it is also impossible here to cover a very large range of transmission ratios.

BRIEF SUMMARY OF THE INVENTION

The object of the present invention is to provide a modular transmission system that in a simple manner permits a large range of transmission ratios.

According to the present invention there is provided a modular transmission system with at least one transmission stage in a housing and comprising a plurality of transmissions with various transmission ratios, in each of which a first transmission stage comprises an angular gear with an axial pinion offset that is the same for all the transmissions provided for the one transmission stage, and in which there is provided one angular gear with at least one first pinion and first planar crown wheel having teeth that project parallel to its axis in a crown-wheel configuration and another angular gear with a second pinion and a second planar crown wheel having teeth arranged in a spiroplan configuration.

By virtue of the invention, one and the same housing accommodates either a SPIROPLAN® transmission stage or a crown-gear transmission stage, while employing the same offset and the same bore. The particular advantage here is the large range of transmission ratios that results, because a SPIROPLAN® transmission stage and a crown-gear transmission stage enable transmission ratios to vary widely. The ratios for a crown-gear stage are about 1-6, while those for a SPIROPLAN® stage are 6-200. Overall, then, with this modular system a transmission-ratio range of 1-200 can be covered with only one transmission stage in a single housing.

Regarding the SPIROPLAN® gearing, it should be noted that here the term is meant to denote gearings belonging to the category of angular gears. These are employed to transmit power between intersecting or crossing shafts. From a kinematic viewpoint, this is a spiral bevel gearing that resembles a worm-gear mechanism, except that unlike a worm gear, in this case a cylindrical worm meshes with a planar crown wheel as mating gear and not with a globoid worm wheel. The offset provided here is achieved by a curved longitudinal configuration of the teeth of the wheel.

A SPIROPLAN® gearing is described, for example, in the applicant's patent DE 43 09 559.

In contrast, the crown-gear arrangement (according to Niemann/Winter, Vol. III, Section 24.1.3) amounts kinematically to a pair of bevel gears in which the profile displacements change along the width of the teeth, in such a way that a cylindrical pinion and a planar crown wheel as mating wheel are produced. In the case of a straight-toothed pinion and axial offset the longitudinal tooth-flank shape of the wheel is a straight line, whereas with an oblique-toothed pinion it is curved.

In particular, therefore, the proposed solution of the problem cited above is a modular transmission system with least one structural element, encased in a housing, that comprises a plurality of gearings with different transmission ratios, in each of which there is a first transmission stage that comprises an angular gear with axial offset incorporating an input drive pinion that meshes with a planar crown wheel having teeth that project parallel to the axis. In this system the axial offset is the same for all the transmission stages in a given structural element, and there are provided at least one first pinion with a first such planar crown wheel having a crown-gear tooth configuration and a second pinion with a second such planar crown wheel having a SPIROPLAN® tooth configuration.

Preferably the housing also includes a second transmission stage that is rotationally connected to the input drive stage and that comprises at least two cylinder gears. This enables the range of transmission ratios to be expanded.

In a first preferred embodiment the planar crown wheel in the first transmission stage is connected by way of a common bearing shaft to a pinion in the second transmission stage, so that the angular gear constitutes an input drive stage. Especially advantageous in this regard is the fact that when running rapidly, this transmission stage makes less noise than would be achievable with cylinder or bevel gears. Given that an angular stage is always more expensive than a cylinder-gear stage of the same size, a saving in expense is also obtained, because the site of action of the lower torque can be of smaller dimensions. A tooth-bearing adjustment like that for worm-gear or bevel-gear mechanisms is thus not needed here.

In another embodiment of the invention an output wheel of the second transmission stage is connected to the input drive pinion of the first transmission stage, by way of a common bearing shaft, so that the angular gear forms an output-drive stage. The advantage of this arrangement lies in the fact that the cylinder gears already available in standard kits (in particular those supplied by the applicant) can be used, so that their transmission-ratio variability can be exploited economically. Nevertheless, by this means only two or three different transmission ratios of the output angular-gear stage (in particular SPIROPLAN® stage) are needed to provide a sufficient range of ratios. Here, again, the construction of the transmission system is simple and requires no tooth-bearing adjustment such as is required for worm- or conical-gear mechanisms. The result is an especially shock-absorbing and low-noise operation. Another important point in this regard is that the axial offset of the pinion makes room for the cylinder-gear transmission stage, so that the system as a whole can be of particularly flat construction.

In particular in the embodiment in which the angular gear constitutes the output drive stage, it is advantageous for the housing to contain apparatus for flange-mounting a motor, such that the input-drive cylinder gear of the second stage is attached to an output shaft of the motor. This construction is especially economical and compact.

Altogether, the axial offset preferably amounts to between 2/10 and 4/10 of the diameter of the planar crown wheel.

In the following, preferred embodiments of the invention are described in greater detail with reference to the drawings.

DETAILED DESCRIPTION OF THE INVENTION

Figure 1:
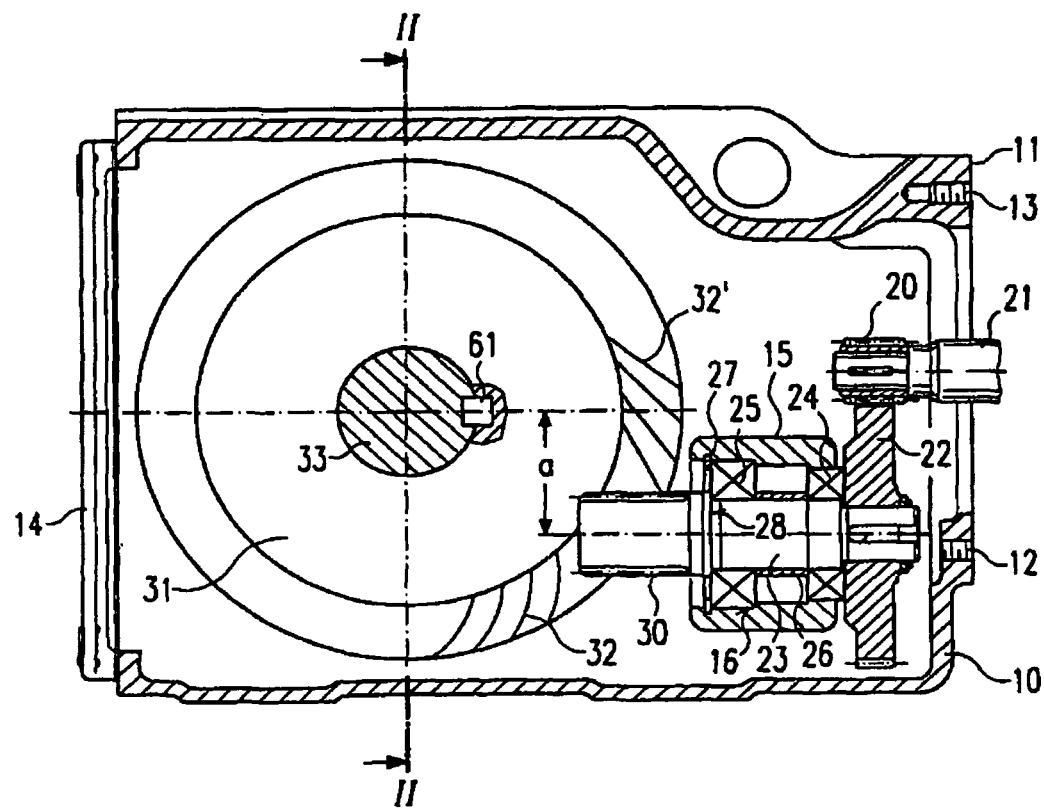
FIG. 1 is a longitudinal section of a first preferred embodiment of the invention, in which a first stage of the transmission system comprises a pair of cylinder gears.

In the following description, the same reference numerals are used for identical parts or parts with identical actions.

Figure 2:
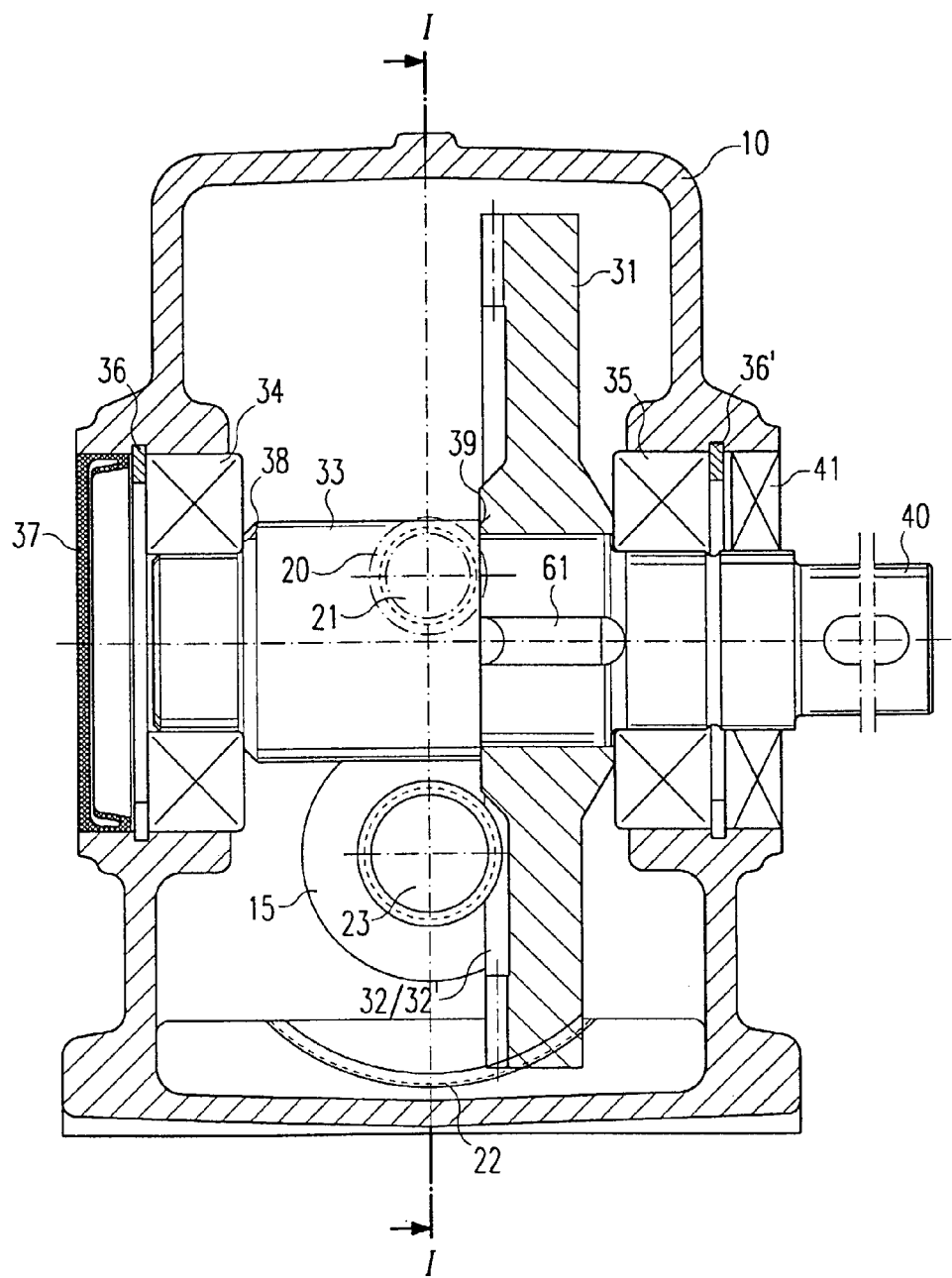
FIG. 2 is a schematic sectional view of the transmission system shown in FIG. 1 along the line II-II.

As can be seen in FIGS. 1 and 2, a housing 10 is provided that comprises on one side a flange 11 for mounting an electric motor (not shown here), for the attachment of which bores 12, 13 are provided in the housing 10. To make the interior of the housing accessible a cover 14 is provided, which is fixed firmly to the housing 10 by means of threaded bolts (not shown) and sealing devices. When a motor has been mounted on the housing, a cylindrical pinion 20 attached to a motor shaft 21 projects into the housing 10 through its open side next to the flange 11. The cylindrical pinion 20 meshes with a cylinder gear 22 that is splined onto a first shaft 23, which is supported in a bearing section 15 of the housing 10 by way of a first bearing 24 and a second bearing 25. The first bearing 24 abuts with one outer surface against the cylinder gear 22 and with an inner surface against a spacer 26, the other end of which contacts a first end face of the second bearing 25. The second bearing 25 is attached between a shoulder 16 of the bearing section 15 and a retaining ring 27, while the first shaft 23 is apposed by way of a shoulder 28 to the surface of the second bearing 25 that faces away from the cylinder gear 22. In this way the shaft 23 is secured against axial displacement within the bearing section 15.

At its end opposite the cylinder gear 22 the first shaft 23 is provided with an angular-gear pinion 30, the teeth of which mesh with those of a planar crown gear 31. The latter can have teeth configured in either SPIROPLAN® form 32 or crown-wheel form 32', depending on the desired transmission ratio. The shapes of the tooth flanks indicated in FIG. 1 are meant to illustrate this circumstance, in that the tooth-flank configuration labeled 32' represents a crown-wheel gearing with straight-toothed pinion, whereas when an oblique-toothed pinion is used for a crown-wheel gearing, the tooth flanks would be curved. In both cases, i.e. both when the angular-gear pinion 30 and the planar crown wheel 31 are provided with a SPIROPLAN® tooth configuration 32 and when the two tooth configurations correspond to a crown-wheel gearing 32', an offset a is provided between the axis of the shaft 23 and that of a second shaft 33 of the planar crown wheel 31. That is, the only difference here is between the tooth geometries of the planar crown wheel 31 and the pinion 30, the other components being identical; nevertheless, widely differing transmission ratios can be obtained (as is known per se) with these two tooth-flank shapes.

The second shaft 33 of the planar crown wheel 31 is supported within the housing 10 by way of a third bearing 34 and a fourth bearing 35. One outer surface of the third bearing 34 contacts a retaining ring 36 seated in the housing 10. In the embodiment shown here a cover 37 is provided to cover the third bearing 34. The third bearing 34 also makes contact with a first shoulder 38 of the shaft 33, so that fixation of the shaft 33 in the axial direction (toward the left in FIG. 2) is ensured.

The planar crown wheel 31 is apposed to a second shoulder 39 of the shaft 33 and is nonrotatably fixed to the shaft 33 by means of a spline 61. On its side opposite the second shoulder 39 the planar crown wheel 31 makes contact with one side of the fourth bearing 35, which on its other side rests against a retaining ring 36' that is fixed within the housing 10. As a result, the shaft 33 and the planar crown wheel 31 are secured against movement in the axial direction within the housing 10, by means of the bearings 34 and 35.

The shaft 33 comprises an output drive stud 40, which passes through a sealing ring 41 set into the housing 10. A machine element that is to be driven can be splined onto the output stud 40. As can readily be seen in FIG. 2, the shaft 33 can also be provided with two output drive studs if the cover 37 is removed and, instead, a second seal is provided at this end. An arrangement opposite to that shown in FIG. 2, in which the output drive stud 40 projects leftward and the cover 37 is seated on the right side, is of course also possible, because the housing 10 is symmetrically constructed in this respect.

Figure 3:
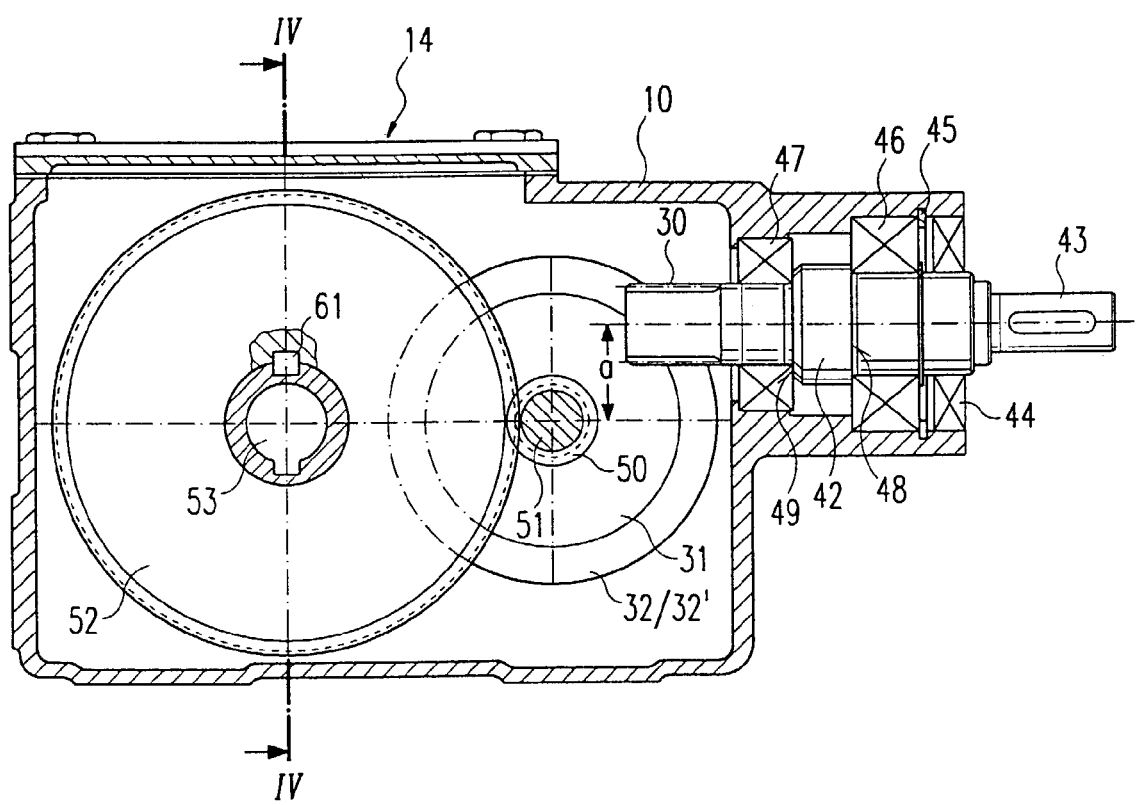
FIG. 3 is similar to FIG. 1 but of a second embodiment of the invention in which an input drive stage of the transmission system is an angular gear.
Figure 4:
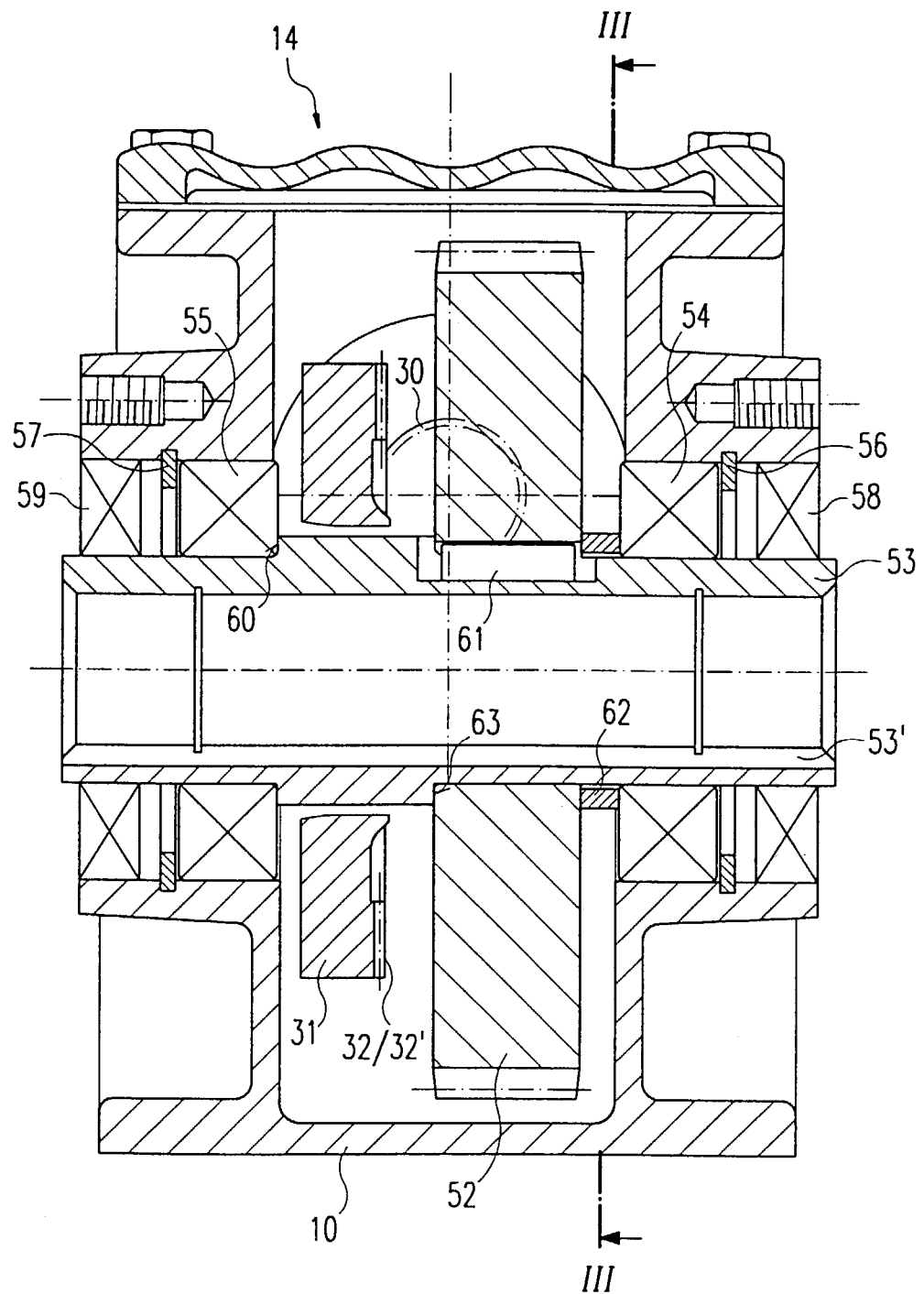
FIG. 4 is a section through the transmission system of FIG. 3 along the line IV-IV.

The embodiment of the invention shown in FIGS. 3 and 4 differs in principle from that in FIGS. 1 and 2 with respect to the order in which angular gear and cylinder gear are disposed. That is, in the embodiment shown in FIGS. 3 and 4 an input drive shaft 42 is provided that comprises a drive stud 43 projecting out of the housing 10, onto which a driving element can be splined. The input drive shaft 42 is sealed to the housing 10 by a sealing ring 44 and is supported by an outer bearing 46 and an inner bearing 47. The outer bearing 46 is seated between a shoulder in the housing 10 and a retaining ring 45 and abuts against a first shoulder 48 on the input drive shaft 42. The inner bearing 47 is apposed to a second shoulder 49 of the input drive shaft 42 and on the other side, to a shoulder of the housing 10. In this way the input drive shaft 42 is fixed within the housing 10 so that it cannot be moved in the axial direction.

At its other end, opposite the drive stud 43, the input drive shaft 42 is provided with the angular-gear pinion 30, which— depending on the particular embodiment—can have a SPIROPLAN® or a crown-wheel tooth configuration, as explained above. The angular-gear pinion 30 meshes with the teeth 32 or 32' of the planar crown gear 31, which is seated on a shaft 51 to which is also fixed a first cylinder gear 50; hence the cylinder gear 50 and the planar crown wheel 31 are connected so that they cannot rotate with respect to one another.

The first cylinder gear 50 meshes with a second cylinder gear 52, which is nonrotatably fixed to a drive shaft 53 by means of a spline 61. The drive shaft 53 is constructed as a hollow shaft, throughout which runs a longitudinal groove 53' that can be used to spline into place an element that is to be driven. The drive shaft 53 is seated in the housing by way of a first bearing 54 and a second bearing 55. At its outer surface the first bearing 54 makes contact with a retaining ring 56 that is seated in the housing 10. On its other side, the first bearing is apposed to a spacer 62 which in turn is apposed to the second cylinder gear 52. The second cylinder gear 52 rests against a shoulder 63 of the drive shaft 53.

The second bearing 55 contacts with its outer surface a second retaining ring 57 seated in the housing 10. On its other side the second bearing 55 makes contact with a shoulder 60 of the drive shaft 53, so that the drive shaft 53 and the second cylinder gear 52 mounted thereon are secured against axial displacement. For sealing the drive shaft 53, at its two ends seals 58 and 59 are provided.

The exemplary embodiments of the invention described above each display individual elements that are interchangeable between the two embodiments. In particular, for example, it is possible in the second embodiment of the invention, shown in FIGS. 3 and 4, also to dispose the angular-gear pinion 30 directly on the shaft of an input drive motor and to provide the housing 10 with a flange 11 and bores 12, 13 for direct flange-mounting of the motor, as is shown in FIGS. 1 and 2. It is likewise possible in the embodiment according to FIGS. 1 and 2 to replace the flange 11 and the attachment bores 12, 13 by the input drive shaft 42 shown in FIGS. 3 and 4, with its bearing in the housing and the drive stud 43 for connection to external apparatus as desired.

Furthermore, the construction of the drive shaft 53 as a hollow shaft as shown in FIGS. 3 and 4 can be applied in the embodiment according to FIGS. 1 and 2 and, conversely, the unilateral arrangement of the drive shaft according to FIGS. 1 and 2 is applicable in the embodiment according to FIGS. 3 and 4. As a result, a modular transmission system with extreme versatility is created. In particular the cylinder-gear transmission stages can be composed of cylinder gears such as are provided in the cylinder-gear transmission modules that are already widely available, so that a broad palette of transmission ratios can be implemented at low cost. Because the angular gear can be employed with either a SPIROPLAN® or a crown-wheel tooth configuration, the range of transmission ratios becomes extremely broad.

LIST OF REFERENCE NUMERALS

10 Housing
11 Flange
12 Bore
13 Bore
14 Cover
15 Bearing section
16 Shoulder
20 Cylindrical pinion
21 Motor shaft
22 Cylinder gear
23 First shaft
24 First bearing
25 Second bearing
26 Spacer
27 Retaining ring
28 Shoulder
30 Angular-gear pinion
31 Planar crown wheel
32 SPIROPLAN® tooth configuration
32' Crown-wheel tooth configuration
33 Second shaft
34 Third bearing
35 Fourth bearing
36 Retaining ring
36' Retaining ring
37 Cover
38 First shoulder
39 Second shoulder
40 Output drive stud
41 Sealing ring
42 Input drive shaft
43 Input drive stud
44 Sealing ring
45 Retaining ring
46 Outer bearing
47 Inner bearing
48 First shoulder
49 Second shoulder
50 First cylinder gear
51 Shaft
52 Second cylinder gear
53 Output drive shaft
53' Groove
54 First bearing
55 Second bearing
56 First retaining ring
57 Second retaining ring
58 First seal
59 Second seal
60 Shoulder
61 Spline
62 Spacer
63 Shoulder

The invention claimed is:

1. A gear unit comprising:
    a housing;
    a first shaft rotatably disposed at a fixed location in said housing, said first shaft having an angular pinion gear at one end thereof, and having a cylinder gear on an opposite end thereof;
    a bearing section of said housing, which bearing section supports an intermediate portion of said first shaft in said housing, in an opening in said bearing section, via first and second bearings mounted on said first shaft, wherein a first retaining ring is seated in the bearing section on a side of the second bearing that is opposite of a side of the second bearing that faces the first bearing, and wherein the first bearing abuts one outer surface of the cylindrical gear;
    an opening in said housing through which a cylindrical pinion on a motor shaft of a motor meshes with said cylinder gear when said motor is mounted on said housing;
    a second shaft rotatably disposed at a fixed location in said housing, said second shaft having a crown wheel at an intermediate portion thereof;
    first and second openings in said housing which openings support, within said housing, a first end of said second shaft and a portion of said second shaft that is on a side of said crown wheel that is opposite said first end, via third and fourth bearings mounted on said second shaft, with said crown wheel meshed with said angular pinion gear of said first shaft, and with a second end of said second shaft, opposite said first end, projecting out of said housing, wherein the fourth bearing contacts the crown wheel;

a second retaining ring seated in the first opening in the housing, wherein the second retaining ring is arranged on a side of the third bearing that is opposite of a side of the third bearing that faces the fourth bearing;

a third retaining ring seated in the second opening in the housing, wherein the third retaining ring is arranged on a side of the fourth bearing that is opposite of a side of the fourth bearing that faces the third bearing, wherein said first shaft, with said pinion gear and said first and second bearings mounted thereon, and said second shaft, with said crown wheel and said third and fourth bearings mounted thereon, together form an angular gear stage;

said housing accepts interchangeably installation of different angular gear stages comprising gear pairs selected from a multiplicity of angular gear pairs with differing tooth configurations and gear ratios, including both cylindrical oblique tooth pinions that mesh with crown wheels having curved tooth flanks, and cylindrical pinions with a worm configuration that mesh with a crown wheel having curved tooth flanks.

2. The gear unit according to claim 1, wherein a rotational axis of said angular pinion gear is offset by a fixed distance from a rotational axis of said crown wheel, which fixed distance is between $2/10$ and $4/10$ of a diameter of said crown wheel.

3. The gear unit according to claim 1, wherein said multiplicity of angular gear pairs collectively provide gear ratios throughout a range of from 1-200.

4. The gear unit according to claim 1, further comprising:
a sealing ring arranged in the second opening in the housing, wherein the sealing ring is arranged on a side of the third retaining ring that is opposite of a side of the third retaining ring that faces the fourth bearing.

5. The gear unit according to claim 1, further comprising:
a spacer arranged in the bearing section between the first and second bearings.

6. The gear unit according to claim 1, further comprising:
a cover arranged in the first opening in the housing on a side of the second retaining ring that is opposite of a side of the second retaining ring that faces the third bearing.

7. The gear unit according to claim 1, wherein the housing has a symmetrical construction that allows the second end of the second shaft to project out of the first or second openings.

8. A variably configurable transmission system comprising:
a housing;
a structure for mounting a motor to said housing;
a pair of gears supported rotatably at a fixed location within said housing, without a motor being mounted to said housing, by bearings mounted on shafts of said pair of gears;
said pair of gears comprising a pinion gear and a crown wheel;
a first cylinder gear mounted on the crown wheel gear;
a second cylinder gear configured to mesh with the first cylinder gear; and
an arrangement for operatively coupling a motor, when mounted to said housing, to drive said pair of gears;
wherein,
i) with said pair of gears installed in said housing, teeth of said pinion gear engage with teeth on a face of said crown wheel;
ii) said housing is configured to receive said bearings with a rotational axis of said pinion gear offset by a fixed distance from a rotational axis of said crown wheel;
iii) said housing has a configuration that accepts, interchangeably, installation of pairs of gears selected from a multiplicity of pairs of gears with differing tooth configurations and gear ratios, including both cylindrical oblique tooth pinions that mesh with crown wheels having curved tooth flanks, and cylindrical pinions that have a worm configuration and mesh with crown wheels having curved tooth flanks;
iv) said housing is configured to receive said bearings such that said fixed distance is maintained at a constant value which does not vary with or depend on the configuration of a particular pinion and crown wheel combination that is supported within said housing;
v) said pinion gear is discrete from a shaft of said motor, and remains in said housing at said fixed location when said motor is dismounted from said housing;
vi) said bearings include
an outer bearing mounted on a shaft of the pinion gear between a first shoulder in the housing and a first retaining ring and the outer bearing abuts a first shoulder of the shaft of the pinion gear, and
an inner bearing mounted on the shaft of the pinion gear between a second shoulder of the drive shaft of the pinion gear and a second shoulder in the housing.

9. The transmission system according to claim 8, wherein said housing has openings integrated into a structure thereof, which openings have respective diameters that correspond to respective diameters of each of said bearings for all pairs of gears that are included in said multiplicity of pairs of gears, whereby said pairs of gears are interchangeably mountable within said openings.

10. The variably configurable transmission system of claim 8, further comprising:
a second drive shaft, wherein the second cylinder gear is mounted on the second drive shaft;
a first bearing mounted on the second drive shaft, wherein the first bearing is arranged between a second retaining ring seated in the housing and a first side of a spacer, wherein a second side of the spacer is arranged apposed to the second cylinder gear; and
a second bearing mounted on the second drive shaft, wherein the second bearing is arranged between a third retaining ring seated in the housing and a shoulder of the second drive shaft.

11. The variably configurable transmission system of claim 10, wherein the second shaft is a hollow shaft.

* * * * *